(12) United States Patent
Lin

(10) Patent No.: US 7,570,479 B2
(45) Date of Patent: Aug. 4, 2009

(54) SOLID ELECTROLYTIC CAPACITOR

(75) Inventor: Chieh-Fu Lin, Kaohsiung Hsien (TW)

(73) Assignee: Gemmy Electronics Co., Ltd., Kaohsiung Hsien (TW)

( * ) Notice: Subject to any disclaimer, the term of this patent is extended or adjusted under 35 U.S.C. 154(b) by 31 days.

(21) Appl. No.: 11/876,950

(22) Filed: Oct. 23, 2007

(65) Prior Publication Data

US 2009/0103248 A1    Apr. 23, 2009

(51) Int. Cl.
*H01G 2/10* (2006.01)
*H01G 9/08* (2006.01)
*H01G 4/228* (2006.01)

(52) U.S. Cl. .................................. 361/535; 361/540

(58) Field of Classification Search ............... 361/523, 361/528, 532–541
See application file for complete search history.

(56) References Cited

U.S. PATENT DOCUMENTS 6,898,066 B1 * 5/2005 Lin ..................... 361/301.3

FOREIGN PATENT DOCUMENTS

JP    05036575 A  *  2/1993

* cited by examiner

*Primary Examiner*—Eric Thomas
(74) *Attorney, Agent, or Firm*—Christopher P. Maiorana, PC

(57) ABSTRACT

An electrolytic capacitor has at least one capacitor element and an insulating housing. Each capacitor element has a body and at least two leads. The leads connect to the body. The insulating housing has a base. The base has a top with at least one opening, a bottom, at least two holes and at least one chamber. The opening is sealed after the at least one capacitor element is mounted in the base. The holes are defined through the bottom and allow the leads to extend out and to be fastened with sealant. The chamber is formed in the base, communicates with the opening and the holes and receives the capacitor element. Because the electrolytic capacitor is simple, the electrolytic capacitor is assembled easily and quickly to lower cost. Further, the insulating housing is able to hold multiple capacitor elements, so the solid electrolytic capacitor has an increased capacitance.

14 Claims, 7 Drawing Sheets

SOLID ELECTROLYTIC CAPACITOR

BACKGROUND OF THE INVENTION

1. Field of Invention

The present invention relates to a solid electrolytic capacitor, and more particularly to a solid electrolytic capacitor that has a simple structure and can be assembled quickly at a low cost.

2. Description of the Related Art

With reference to FIG. 8, a conventional aluminum electrolytic capacitor has a capacitance and comprises an aluminum housing (40), a capacitor element (50) and a seal rubber (60). The aluminum housing (40) has an open bottom and an inner chamber (41). The capacitor element (50) is mounted in the inner chamber (41) and has a body (51) and two leads (52). The body (51) is coiled and comprises an anode foil, a cathode foil and two separators. The separators are mounted between the anode foil and the cathode foil to separate the anode foil and the cathode foil. The leads (52) connect respectively to the anode foil and the cathode foil. The seal rubber (60) seals the open bottom and has two holes (61). The holes (61) are defined through the seal rubber (60) and allow the leads (52) to extend through the holes (61). The seal rubber (60) and the capacitor element (50) occupy the inner chamber (41).

However, the seal rubber (60) occupies almost one-third inner chamber (41). If the capacitance is required to increase, the dimension (either a diameter or a height) of the aluminum housing (40) will become larger. For example, when the height of the aluminum housing (40) is limited and can not be changed, the diameter of the aluminum housing (40) will be enlarged. On the contrary, when the diameter of the aluminum housing (40) is limited and can not be changed, the height of the aluminum housing (40) will be increased. Meanwhile, a thickness of the seal rubber (60) must be increased, so the inner chamber (41) cannot be fully utilized. Therefore, a dimension of the capacitor element (50) and a capacitance of the conventional aluminum electrolytic capacitor are limited. Furthermore, when the capacitor element (50) undergoes a soaking procedure, each body (51) of the capacitor element (50) is immersed in a liquid mixture with monomers, an oxidizing agent and other additives in a container. However, the liquid mixture is easy to be cured, so residue of the liquid mixture in the container is wasted. Further, cracks occur easily between the leads (52) and the body (51) when soaking the capacitor element (50). Additionally, because the leads (52) extend through the holes (61) of the seal rubber (60) without fastening to the seal rubber (60), cracks may also occur between the leads (52) and the body (51) when soaking the capacitor element (50) during the period of conveying the aluminum.

As technology progressing, electrolytic capacitors are required small and high capacitance to fit smaller and more delicate electronic devices, such as laptops. Accordingly, a plastic-housing aluminum electrolytic capacitor has been developed. The plastic-housing aluminum electrolytic capacitor has a capacitance and comprises a housing assembly and a capacitor element. The housing assembly is made of plastic and has a body, a base and a cover. The body has a partition. The partition has two through holes and is mounted transversely in the body to divide the body into an upper chamber and a lower chamber. The upper chamber is larger than the lower chamber. The base is flaky, seals the lower chamber and has a bottom, two holes and two grooves. The holes correspond to the through holes. The grooves are formed in the bottom of the base and communicate respectively with the holes. The cover is flaky and seals the upper chamber. The capacitor element is the same as the capacitor element of said aluminum electrolytic capacitor and is mounted in the upper chamber of the body. The leads extend from the through holes in the partition and the holes in the base. After the leads extend the through holes in the partition, the lower chamber is filled with epoxy resin to fasten the leads. Further, after the leads extending from the holes in the base, the leads are bent in opposite directions and are respectively mounted in the grooves.

Because the cover is thin, the upper chamber can be fully utilized. Thus, when the capacitances of the aluminum electrolytic capacitor and the plastic-housing aluminum electrolytic capacitor are the same, the plastic-housing aluminum electrolytic capacitor is smaller than the aluminum electrolytic capacitor.

However, the conventional plastic-housing aluminum electrolytic capacitor has a complex structure and has to use a lot of epoxy resin in the lower chamber, so to assemble the plastic-housing aluminum electrolytic capacitor takes a lot of time. Furthermore, the leads are mounted in the grooves and a top of each lead abuts the groove, so when the conventional plastic-housing aluminum electrolytic capacitor is soldered to a print circuit board (PCB), solder (such as tin) cannot mounted on the top of each lead. Thus, the conventional plastic-housing aluminum electrolytic capacitor cannot be mounted securely on the PCB.

To overcome the shortcomings, the present invention provides a solid electrolytic capacitor to mitigate or obviate the aforementioned problems.

SUMMARY OF THE INVENTION

The primary objective of the present invention is to provide a solid electrolytic capacitor that has a simple structure to facilitate quick assembly at a low cost.

The solid electrolytic capacitor in accordance with the present invention comprises at least one capacitor element and an insulating housing. Each capacitor element has a body and at least two leads. The leads connect to the body. The insulating housing has a base. The base has a top with at least one opening, a bottom, at least two holes and at least one chamber. The opening is sealed after the at least one capacitor element is mounted in the base. The holes are defined through the bottom and allow the leads to extend out and to be fastened with sealant. The chamber is formed in the base, communicates with the opening and the holes and receives the capacitor element.

Because the electrolytic capacitor is simple, the electrolytic capacitor is assembled easily and quickly to lower cost. Further, the insulating housing can hold multiple capacitor elements, so the solid electrolytic capacitor has an increased capacitance.

Other objectives, advantages and novel features of the invention will become more apparent from the following detailed description when taken in conjunction with the accompanying drawings.

DETAILED DESCRIPTION OF THE INVENTION

Figure 1:
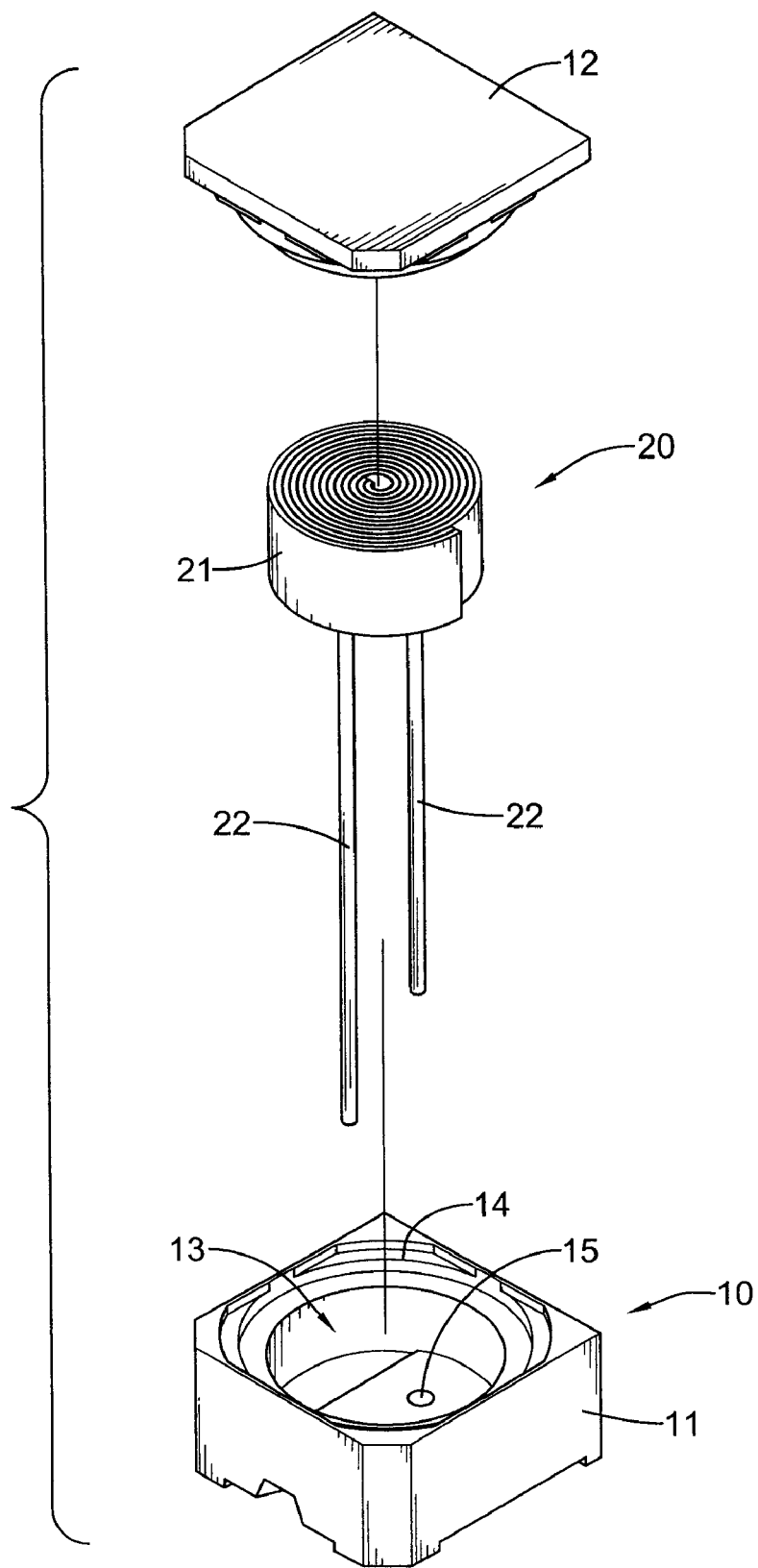
FIG. 1 is an exploded perspective view of a solid electrolytic capacitor in accordance with the present invention.
Figure 2:
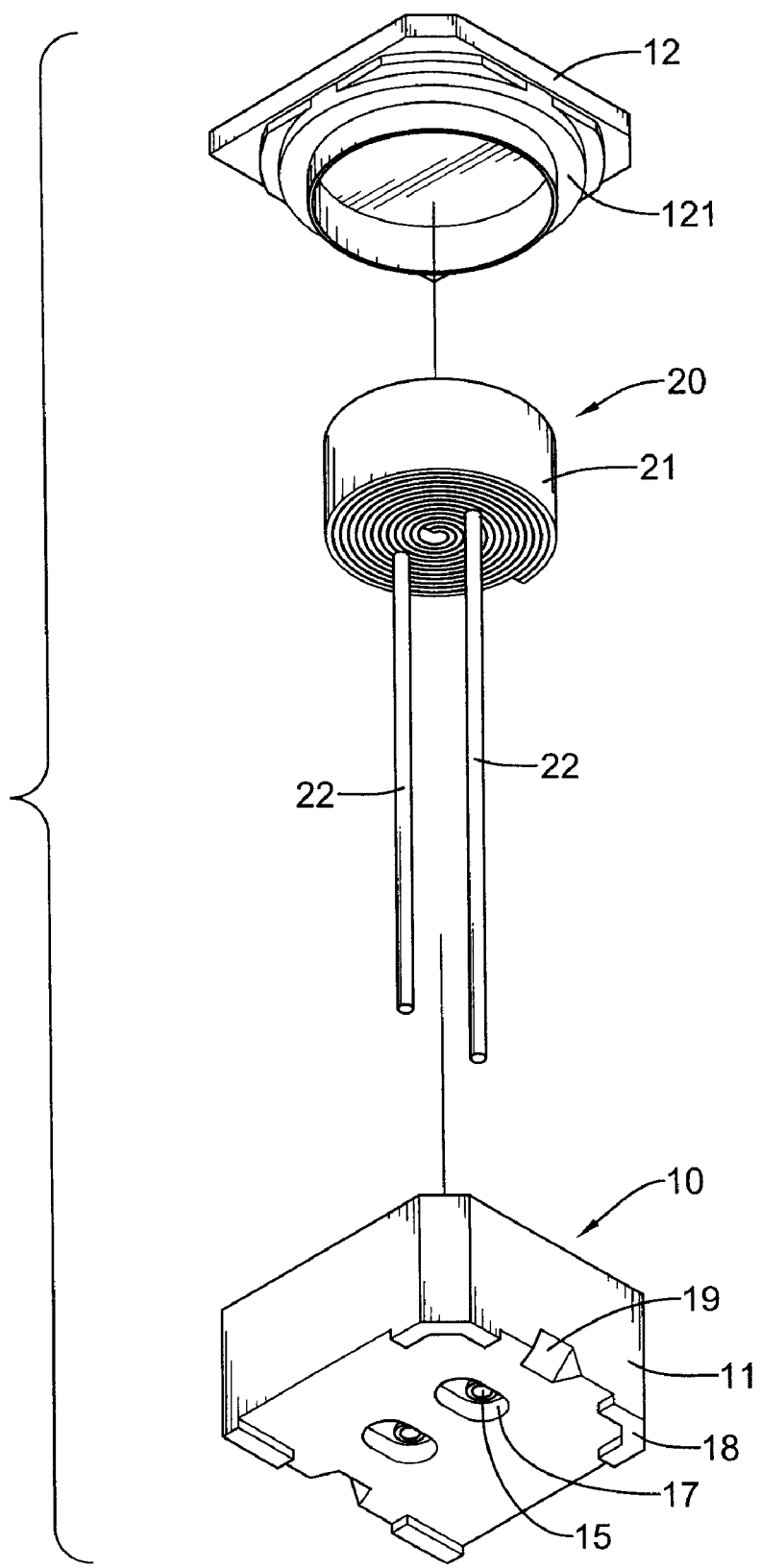
FIG. 2 is another exploded perspective view of the solid electrolytic capacitor in FIG. 1.
Figure 3:
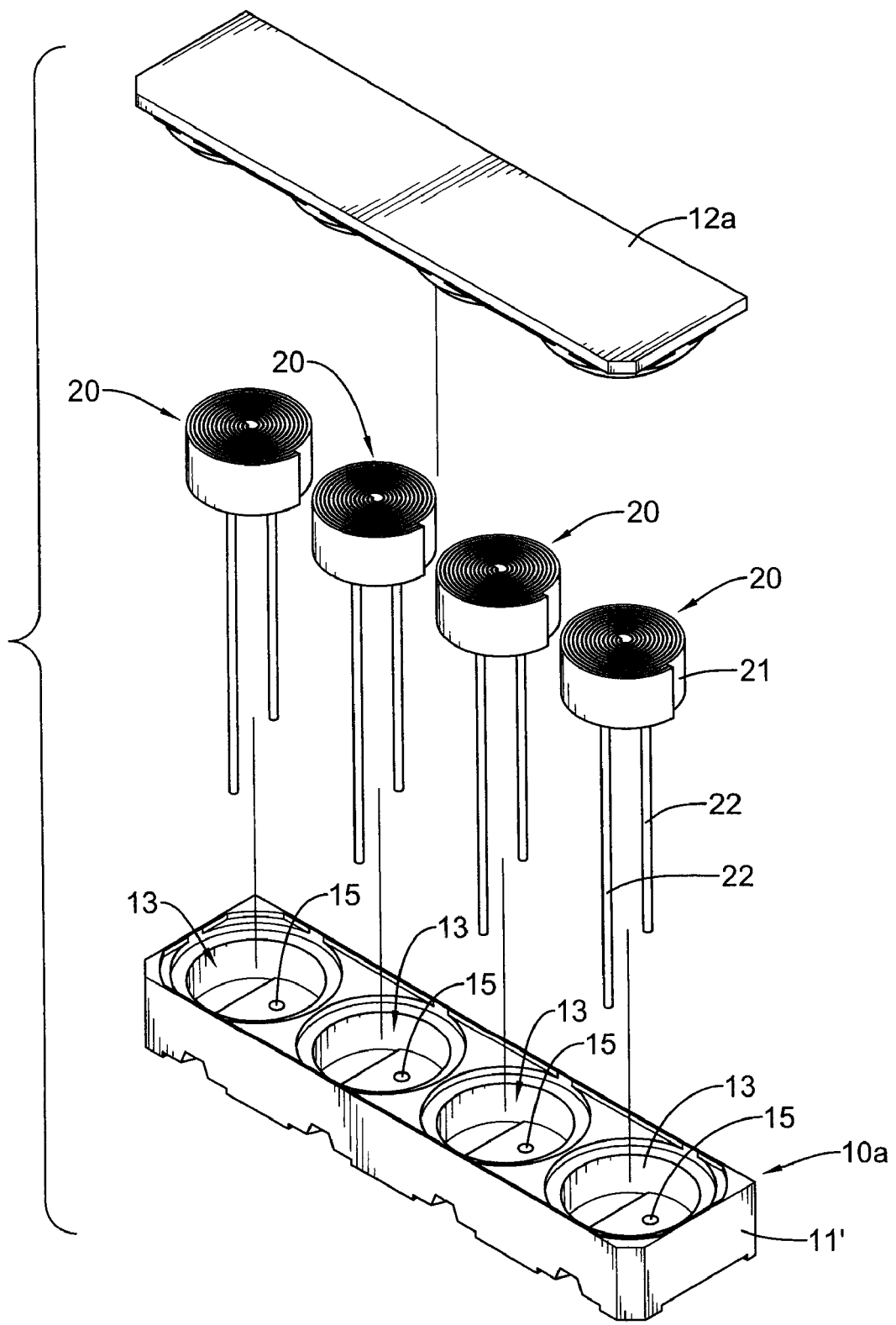
FIG. 3 is an exploded perspective view of another embodiment of a solid electrolytic capacitor in accordance with the present invention with multiple capacitor elements.

With reference to FIGS. 1 to 3, a solid electrolytic capacitor in accordance with the present invention has an insulating housing (10, 10a) and at least one capacitor element (20).

The insulating housing (10, 10a) is made of insulating material such as an insulating plastic, is hollow and comprises a base (11, 11').

The base (11, 11') has a top, a bottom and at least one chamber (13). The top has at least one opening. The bottom has an edge, at least one set of holes (15), at least one set of sealant-filled recesses (17), multiple protrusions (18) and at least one set of notches (19). The holes (15) are defined through the bottom. The sealant-filled recesses (17) of each set are formed in the bottom concentrically respectively with one set of holes (15), communicate respectively with the corresponding set of holes (15) and are filled with sealant such as epoxy resin (16) or the like. The protrusions (18) are formed on and protrude from the bottom to separate the bottom from a surface on which the base (11, 11') is mounted and allow the solid electrolytic capacitor to be attached securely to a printed circuit board (PCB). The protrusions (18) are preferably formed flush with the edge. The notches (19) are trapezoidal and are formed in the edge of the bottom. The at least one chamber (13) is formed in the base (11, 11') and communicates respectively with the at least one opening and the at least one set of the holes (15).

Each capacitor element (20) corresponds to and is mounted in one of the at least one chamber (13) and has a body (21) and at least two leads (22). The body (21) is coiled and comprises at least one anode foil, at least one cathode foil and at least two separator layers. The anode foil has a dielectric film. The dielectric film is an insulating metal oxide and is formed on and covers the anode foil. When the anode foil is made of aluminum, the dielectric film is aluminum oxide ($Al_2O_3$). Each separator layer is mounted between an adjacent anode foil and cathode foil and separates the anode foil from the cathode foil by a specific interval and may comprise a conductive polymer electrolyte. The leads (22) connect respectively to the anode foil and the cathode foil and extend respectively out of the holes (15) of one set, and the sealant-filled recesses (17) are filled with epoxy resin (16) after the leads (22) extending out of the sealant-filled recesses (17) to fasten the leads (22). Each lead (22) may extend vertically from the bottom of the base and may be bent after it extends through the sealant-filled recess (17) to form a soldering segment (221), and each lead (22) may be a rod, a bar or a hybrid. The hybrid lead (22) has a rod and a flattened bar extension. The rod connects to the body (21). The flattened bar extension extends from the recess (17) and is bent parallel to the bottom of the base (11, 11') to form the soldering segment (221). The soldering segment (221) is parallel to the bottom of the base (11) and is mounted in the notch (19), so there is an interval between the soldering segment (22) and the base (11) to allow solder to mounted on a top of the soldering segment (221). Thus, the soldering segment (221) is soldered completely and securely on the PCB. When a number of the leads (22) is more than two, the solid electrolytic capacitor can reduce impedance.

Figure 4:
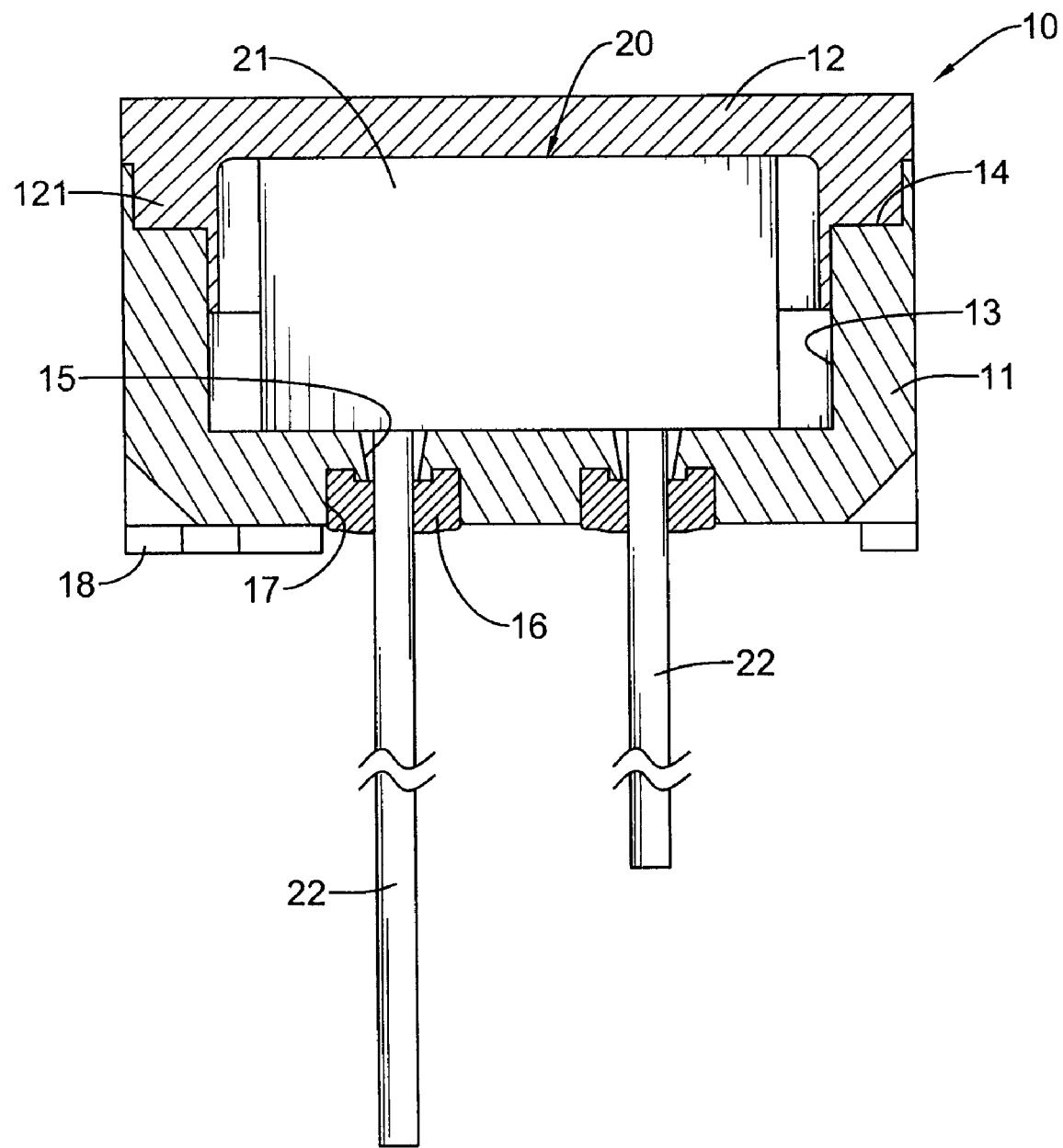
FIG. 4 is a side view in partial section of the solid electrolytic capacitor in FIG. 1 showing that an annular protrusion on a cover is mounted in an annular recess in a base.

With further reference to FIG. 4, the top of the base (11, 11') is flush with a top of the capacitor element (20) and further has at least one annular recess (14). The at least one annular recess (14) is formed respectively in the at least one opening. The at least one opening is sealed by a cover (12, 12a). The cover (12, 12a) seals the at least one opening in the top of the base (11, 11'). The cover (12, 12a) may be molded and has a bottom that has at least one annular protrusion (121). The at least one annular protrusion (121) is formed on and protrudes from the bottom of the cover (12) and corresponds to and is mounted respectively in the at least one annular recess (14). When the bottom of the cover (12) has the annular protrusions (121) and the top of the base (11) has the annular recesses (14), the annular protrusions (121) can be mounted respectively in the annular recesses (14) with an adhesive, by thermal bonding with thermal plastic resin or by ultrasonic bonding.

Figure 5:
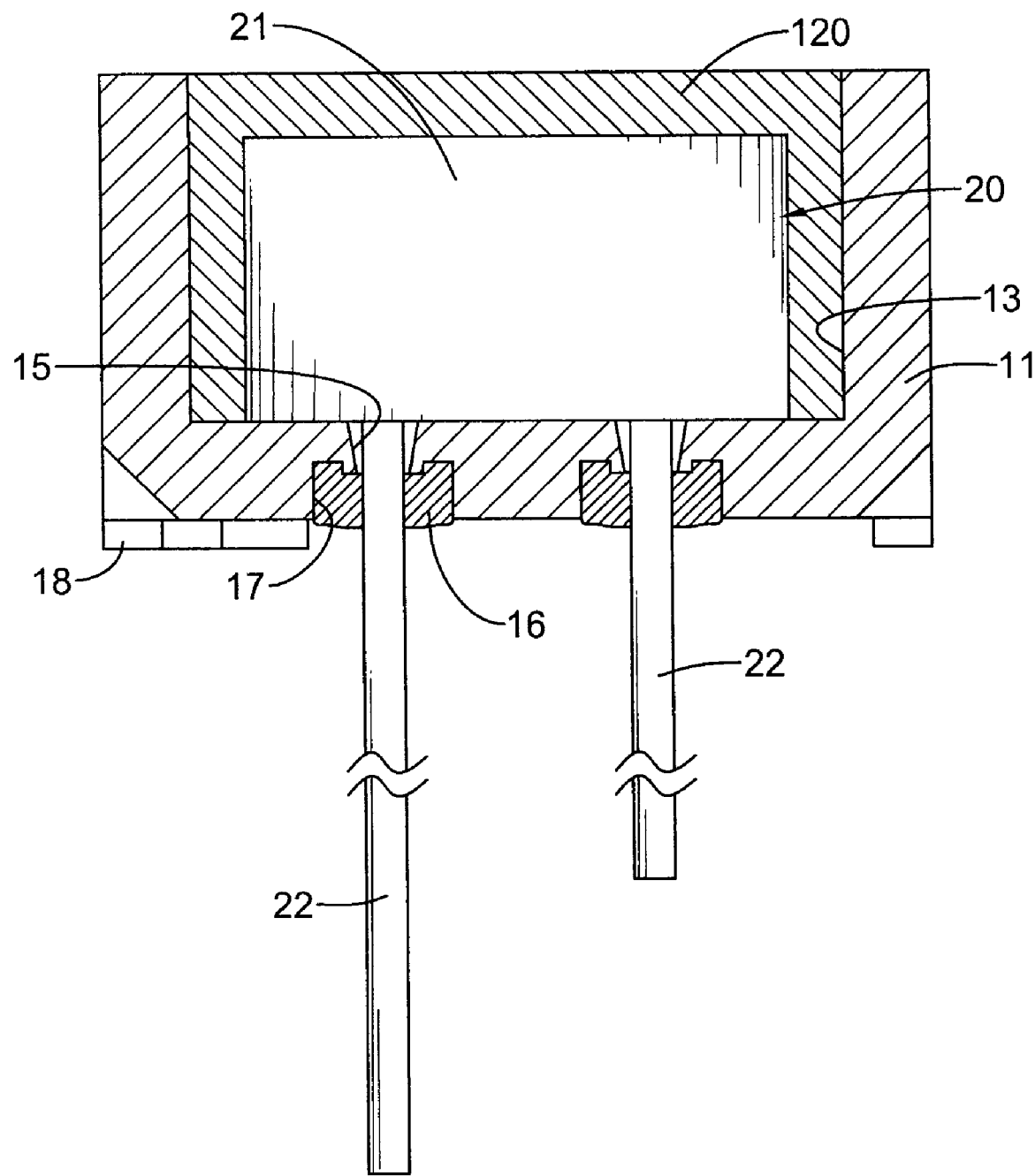
FIG. 5 is a side view in partial section of the solid electrolytic capacitor in FIG. 1 showing that an inner chamber is filled with resin to seal an opening.

With further reference to FIG. 5, the top is flat and is higher than the top of the capacitor element (20). The inner chamber is filled with resin (120) such as epoxy resin. After resin is cured, the at least one opening of the top of the base (11, 11') is sealed by resin (120) and resin (120) is almost flush with the top.

Figure 6:
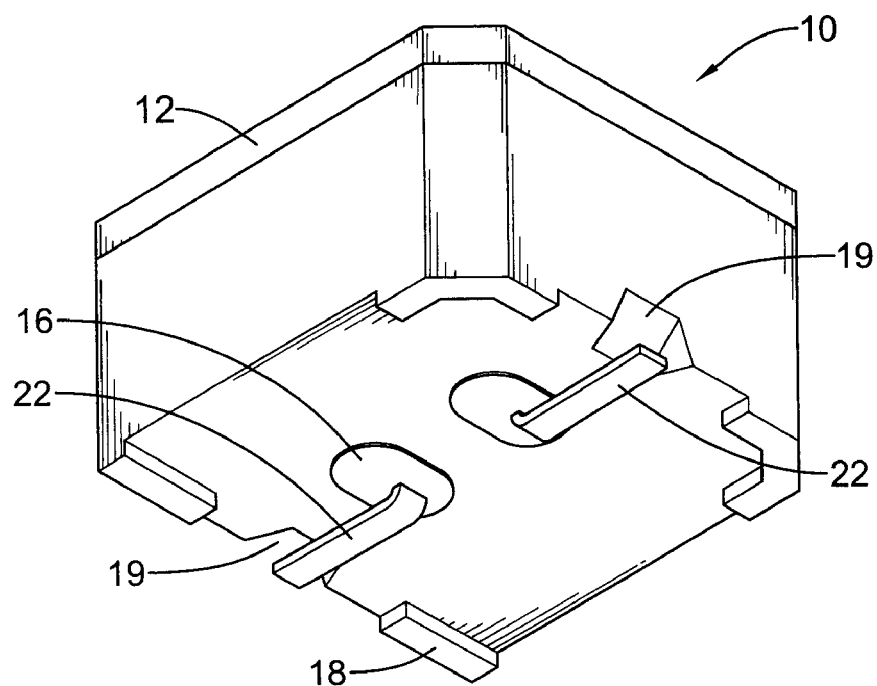
FIG. 6 is a perspective view of the solid electrolytic capacitor in FIG. 1 with a rectangular soldering segment.
Figure 7:
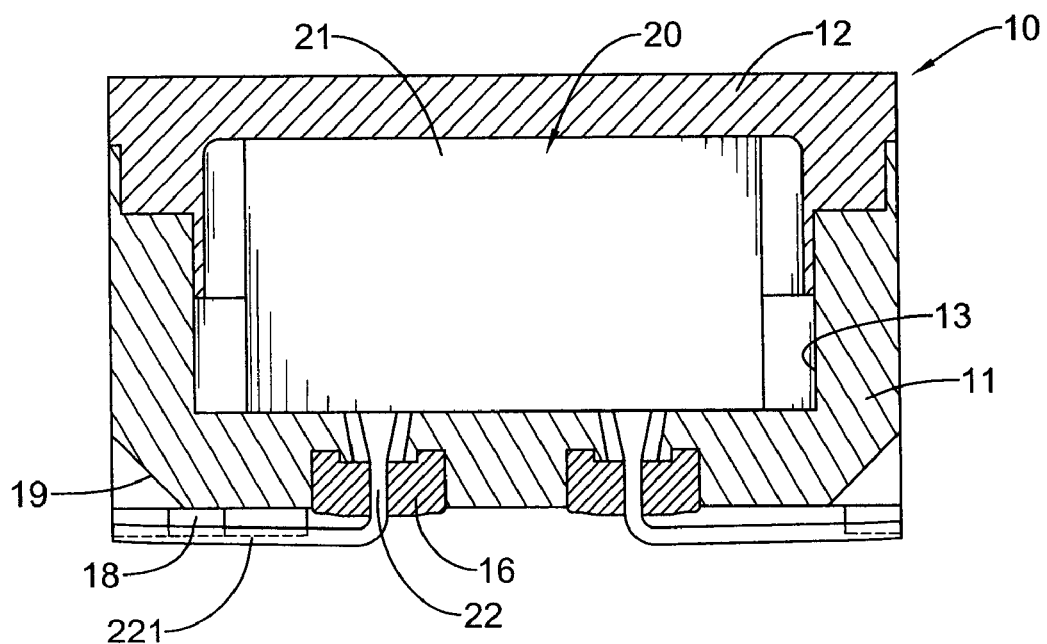
FIG. 7 is a side view in partial section of the solid electrolytic capacitor in FIG. 6.
Figure 8:
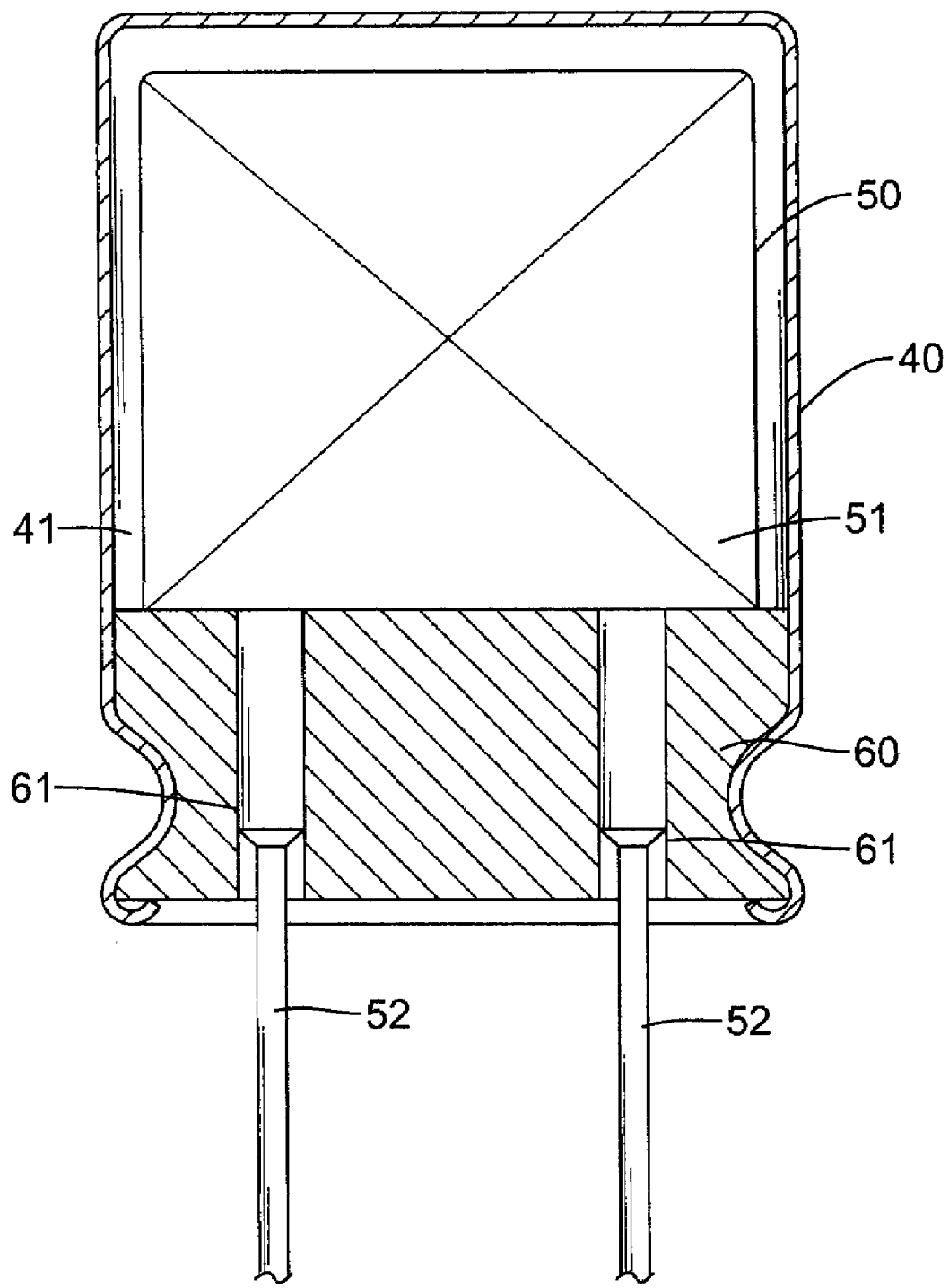
FIG. 8 is a side view in partial section of a conventional aluminum electrolytic capacitor in prior art.

With further reference to FIGS. 6 and 7, the insulating housing (10, 10a) of the solid electrolytic capacitor only has two components including the base (11, 11') and the cover (12, 12a), so the solid electrolytic capacitor is assembled easily and quickly to lower cost. The insulating housing (10, 10a) is able to hold multiple capacitor elements (20) when it has multiple chambers (13). Accordingly, the solid electrolytic capacitor has an increased capacitance. Moreover, the protrusions (18) allow the solid electrolytic capacitor to be mounted stably on the PCB. Furthermore, the notches (19) provide the interval between the leads (22) and the base (11) and allow solder to be mounted on the top of each lead (22), so the leads (22) are soldered firmly on the PCB.

Furthermore, when producing the capacitor element (20), a liquid mixture with monomers, an oxidizing agent and other additives is dropped into the body (21) of the capacitor element (20) that has already been mounted in the chamber (13), so no residue of the liquid mixture will be wasted and no cracks occur between the leads (22) and the body (21) of the capacitor element (20). When conveying the solid electrolytic capacitor of the present invention, cracks either do not occur between the leads (22) and the body (21) because the sealant-filled recesses (17) is filled with epoxy resin (16) to fasten the leads (22). Additionally, there are two sealant-filled recesses (17) rather than the lower chamber in the conventional plastic-housing aluminum electrolytic capacitor recited above. Therefore, the solid electrolytic capacitor of the present invention needs less epoxy resin to save cost.

Even though numerous characteristics and advantages of the present invention have been set forth in the foregoing description, together with details of the structure and function of the invention, the disclosure is illustrative only. Changes may be made in detail, especially in matters of shape, size and arrangement of parts within the principles of the invention to the full extent indicated by the broad general meaning of the terms in which the appended claims are expressed.

What is claimed is:

1. A solid electrolytic capacitor comprising:
   at least one capacitor element, and each one of the at least one capacitor element having
       a body being coiled and having at least one anode foil, at least one cathode foil and at least two separator layers individually formed between the at least one anode foil and the at least one cathode foil; and
       at least two leads connecting respectively to the at least one anode foil and the at least one cathode foil of the body; and
   an insulating housing with a base having
       a top having at least one opening that is sealed after the at least one capacitor element is mounted in the base;
       a bottom having
           an edge; and
           at least one set of holes being defined through the bottom and each one of the at least one set of holes allowing the at least two leads of each one of the at least one capacitor element to extend respectively out;
           at least one set of sealant-filled recesses, and each one of the at least one set of the sealant-filled recesses being formed in the bottom respectively concentric with one of the at least one set of holes, communicating respectively with a corresponding set of holes and being filled with sealant; and
       at least one chamber being formed in the base and communicating respectively with the at least one opening and the at least one set of the holes and each one of the at least one chamber receiving each one of the at least one capacitor element.

2. The solid electrolytic capacitor as claimed in claim 1, wherein each of the at least two separator layers comprises a conductive polymer electrolyte.

3. The solid electrolytic capacitor as claimed in claim 2, wherein
   the top of the base has at least one annular recess being formed respectively in the at least one opening; and
   the at least one opening of the top is sealed by a cover that is molded and has a bottom that has at least one annular protrusion formed on and protruding from the bottom of the cover and corresponding to and mounted respectively in the at least one annular recess.

4. The solid electrolytic capacitor as claimed in claim 2, wherein
   the top of the base is flat and is higher than the capacitor element; and
   the inner chamber of the base is filled with resin to seal the at least one opening of the top of the base.

5. The solid electrolytic capacitor as claimed in claim 2, wherein
   the leads of each one of the at least one capacitor element further extend respectively out of a corresponding one set of sealant-filled recesses in the bottom of the base.

6. The solid electrolytic capacitor as claimed in claim 5, wherein each lead is bent after extending through a corresponding one sealant-filled recess in the bottom of the base to form a soldering segment being parallel to the bottom of the base.

7. The solid electrolytic capacitor as claimed in claim 6, wherein the bottom of the base further has at least one set of notches formed in the edge of the bottom; and
   the soldering segments formed from the leads of each set are mounted respectively in the notches of one set.

8. The solid electrolytic capacitor as claimed in claim 7, wherein each notch is trapezoid.

9. The solid electrolytic capacitor as claimed in claim 8, wherein the bottom of the base further has multiple protrusions formed on and protruding from the edge of the bottom.

10. The solid electrolytic capacitor as claimed in claim 7, wherein the bottom of the base further has multiple protrusions formed on and protruding from the edge of the bottom.

11. The solid electrolytic capacitor as claimed in claim 6, wherein the bottom of the base further has multiple protrusions formed on and protruding from the edge of the bottom.

12. The solid electrolytic capacitor as claimed in claim 5, wherein the bottom of the base further has multiple protrusions formed on and protruding from the edge of the bottom.

13. The solid electrolytic capacitor as claimed in claim 2, wherein each lead extends vertically from the bottom of the base.

14. The solid electrolytic capacitor as claimed in claim 13, wherein the bottom of the base further has multiple protrusions formed on and protruding from the edge of the bottom.

* * * * *